United States Patent
Greene et al.

(10) Patent No.: US 9,845,091 B2
(45) Date of Patent: Dec. 19, 2017

(54) VEHICLE TRACTION CONTROL BASED DRIVELINE THERMAL PROTECTION

(71) Applicants: GM GLOBAL TECHNOLOGY OPERATIONS LLC, Detroit, MI (US); Kelsey-Hayes Company, Livonia, MI (US)

(72) Inventors: James J. Greene, Hartland, MI (US); Craig Mitchell, Swartz Creek, MI (US)

(73) Assignees: GM GLOBAL TECHNOLOGY OPERATIONS LLC, Detroit, MI (US); KELSEY-HAYES COMPANY, Livonia, MI (US)

( * ) Notice: Subject to any disclaimer, the term of this patent is extended or adjusted under 35 U.S.C. 154(b) by 0 days.

(21) Appl. No.: 15/148,424

(22) Filed: May 6, 2016

(65) Prior Publication Data

US 2017/0320487 A1  Nov. 9, 2017

(51) Int. Cl.
| | |
|---|---|
| *B60W 30/00* | (2006.01) |
| *B60W 10/06* | (2006.01) |
| *B60W 10/18* | (2012.01) |
| *B60T 8/17* | (2006.01) |
| *B60W 30/18* | (2012.01) |
| *B60W 10/184* | (2012.01) |

(Continued)

(52) U.S. Cl.
CPC .............. *B60W 30/00* (2013.01); *B60T 8/172* (2013.01); *B60W 10/06* (2013.01); *B60W 10/184* (2013.01); *B60W 30/188* (2013.01); *B60T 2260/00* (2013.01); *B60W 2400/00* (2013.01); *B60W 2510/0657* (2013.01); *B60W 2510/107* (2013.01); *B60W 2600/00* (2013.01); *B60W 2710/0666* (2013.01); *B60W 2710/1072* (2013.01); *B60W 2710/18* (2013.01)

(58) Field of Classification Search
CPC .... B60W 30/00; B60W 10/06; B60W 30/188; B60T 8/172
See application file for complete search history.

(56) References Cited

U.S. PATENT DOCUMENTS 5,366,281 A * 11/1994 Littlejohn ............... B60L 15/20
188/156
5,901,683 A * 5/1999 Patel ....................... B60L 11/08
123/352

(Continued)

FOREIGN PATENT DOCUMENTS

JP         2015230091 A  * 12/2015

*Primary Examiner* — Rodney A Butler
(74) *Attorney, Agent, or Firm* — Reising Ethington, P.C.

(57) ABSTRACT

A method and system for controlling temperatures in a driveline assembly of a vehicle are provided. In one embodiment, the method includes determining an operating temperature associated with the driveline assembly of the vehicle, the driveline assembly comprising forward and rear axles and a power transfer device configured to transmit power from a power source of the vehicle to the forward and rear axles. The method further includes computing a gain factor responsive to the operating temperature, adjusting a control parameter value of a traction control system of the vehicle responsive to the gain factor, and generating a control signal from the traction control system responsive to the control parameter value, the control signal configured to adjust at least one of an output torque of the power source and a braking force of a brake of the vehicle.

19 Claims, 2 Drawing Sheets

Figure 1:
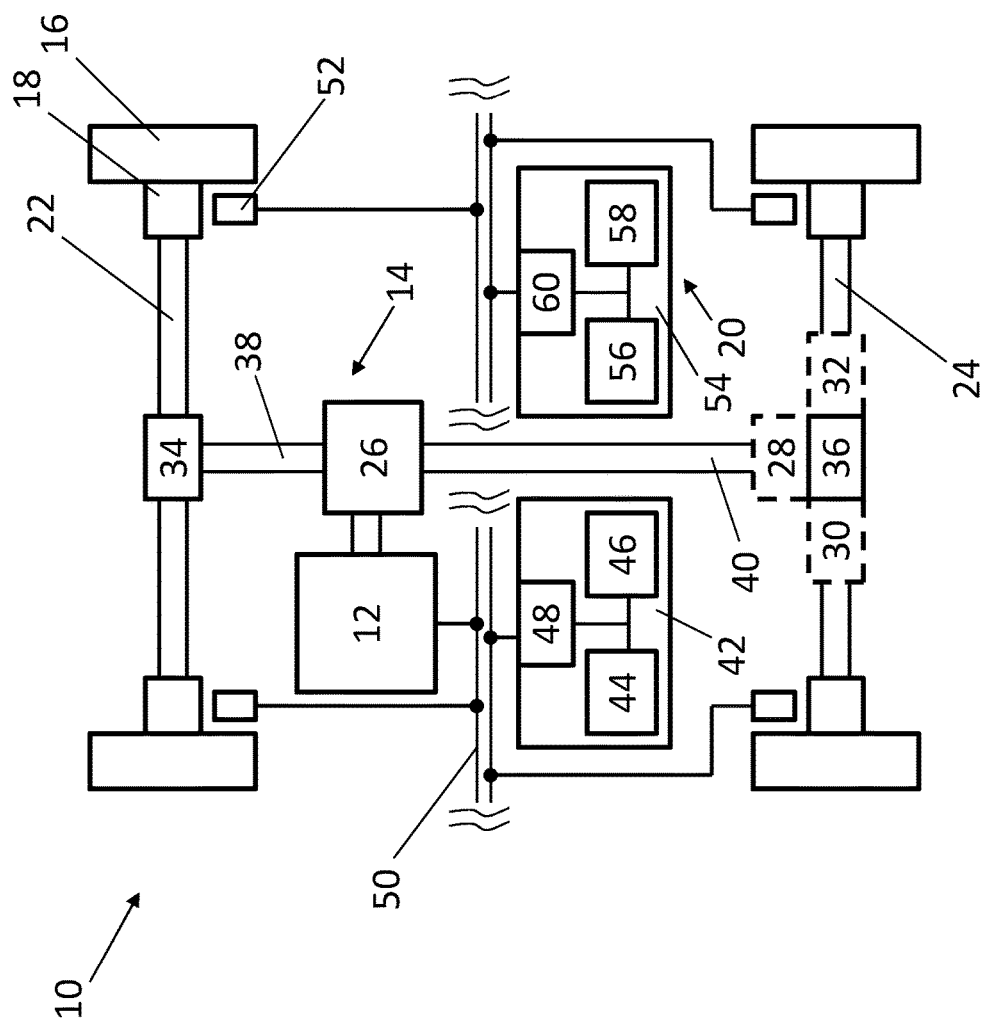

(51) Int. Cl.
*B60T 8/172* (2006.01)
*B60W 30/188* (2012.01)

(56) References Cited

U.S. PATENT DOCUMENTS

| | | | | |
|---|---|---|---|---|
| 2003/0045989 A1* | 3/2003 | Walenty | ............. | B60T 8/17636 |
| | | | | 701/71 |
| 2003/0047362 A1* | 3/2003 | Chernoff | ................ | B60G 3/18 |
| | | | | 180/65.245 |
| 2005/0177294 A1* | 8/2005 | Jiang | .................... | F16D 48/066 |
| | | | | 701/67 |
| 2005/0269149 A1* | 12/2005 | Harumoto | ............. | B60R 21/013 |
| | | | | 180/274 |
| 2010/0049400 A1* | 2/2010 | Duraiswamy | ....... | B60W 30/143 |
| | | | | 701/33.4 |
| 2013/0024080 A1* | 1/2013 | Robinson | ............. | B60W 10/10 |
| | | | | 701/54 |
| 2014/0080673 A1* | 3/2014 | Stares | ................... | B60K 17/34 |
| | | | | 477/174 |

* cited by examiner

VEHICLE TRACTION CONTROL BASED DRIVELINE THERMAL PROTECTION

FIELD

The present disclosure relates generally to a vehicle system. More specifically, the disclosure relates to a method and system for controlling temperatures in a driveline assembly of a vehicle.

BACKGROUND

In conventional vehicle drivelines, power may be divided between forward and rear axles on the vehicle and between individual wheels on either side of an axle. Power division between axles may be accomplished using clutches or power transfer devices such as power transfer units or transfer cases. Power division between wheels on an axle may be accomplished using clutches. In each of these power division devices, speed differentials between components in the device due to, for example, wheel slip on icy, snowy or sandy surfaces, may result in overheating. In a clutch, for example, speed differential may cause the clutch to slip and generate frictional heat. Overheating can damage components in the driveline and/or reduce the life of the components.

SUMMARY

According to one embodiment, there is provided a method for controlling temperatures in a driveline assembly of a vehicle including determining an operating temperature associated with the driveline assembly of the vehicle, the driveline assembly comprising a forward axle, a rear axle and a power transfer device configured to transmit power from a power source of the vehicle to the forward and rear axles. The method further includes computing a gain factor responsive to the operating temperature, adjusting a control parameter value of a traction control system of the vehicle responsive to the gain factor, and generating a control signal from the traction control system responsive to the control parameter value. The control signal is configured to adjust at least one of an output torque of the power source and a braking force of a brake of the vehicle.

According to another embodiment, there is provided a method for controlling temperatures in a driveline assembly of a vehicle including determining a first operating temperature associated with a first portion of the driveline assembly of the vehicle, the driveline assembly comprising a forward axle, a rear axle and a power transfer device configured to transmit power from a power source of the vehicle to the forward and rear axles. The method further includes computing a first gain factor responsive to the first operating temperature, determining a second operating temperature associated with a second portion of the driveline assembly of the vehicle, and computing a second gain factor responsive to the second operating temperature. The method further includes adjusting a control parameter value of a traction control system of the vehicle responsive to the first gain factor and the second gain factor; and generating a control signal from the traction control system responsive to the control parameter value. The control signal is configured to adjust at least one of an output torque of the power source and a braking force of a brake of the vehicle.

According to another embodiment, there is provided a system for controlling temperatures in a driveline assembly of a vehicle. The system includes a traction control system. The traction control system includes a controller configured to determine an operating temperature associated with the driveline assembly of the vehicle, the driveline assembly comprising a forward axle, a rear axle and a power transfer device configured to transmit power from a power source of the vehicle to the forward and rear axles. The controller is further configured to compute a gain factor responsive to the operating temperature, adjust a control parameter value of the traction control system responsive to the gain factor, and generate a control signal from the traction control system responsive to the control parameter value. The control signal is configured to adjust at least one of an output torque of the power source and a braking force of a brake of the vehicle.

DRAWINGS

Figure 2:
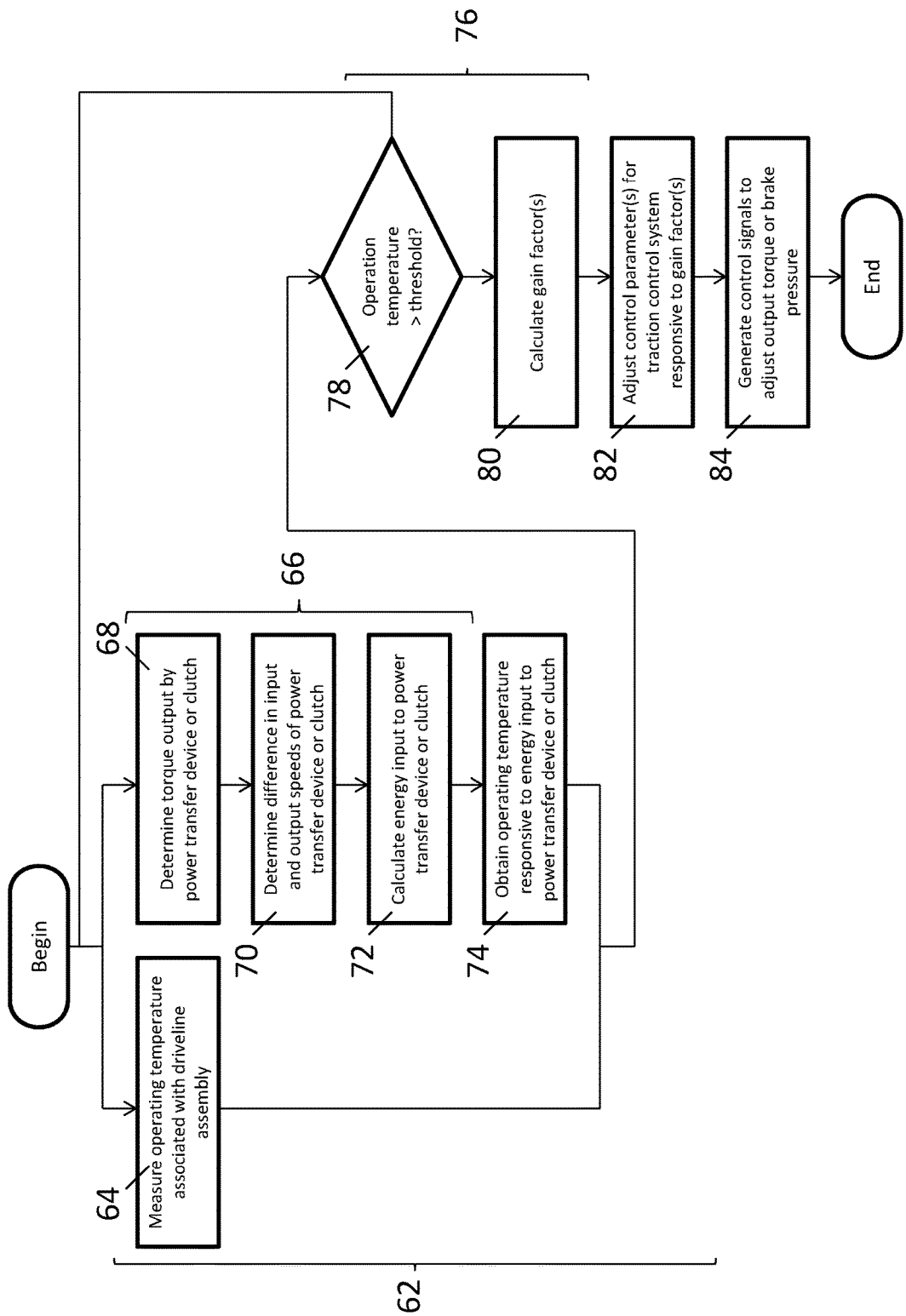

Preferred exemplary embodiments will hereinafter be described in conjunction with the appended drawings, wherein like designations denote like elements, and wherein:

FIG. 1 is a schematic view of an exemplary vehicle including one embodiment of a system for controlling temperatures in a driveline assembly of the vehicle; and, FIG. 2 is a flowchart illustrating embodiments of a method for controlling temperatures in a driveline assembly of a vehicle.

DESCRIPTION

The system and method described herein may be used to control temperatures in a driveline assembly of a vehicle. In particular, the system and method control temperatures in the driveline assembly by determining one or more operating temperatures associated with the driveline assembly. The temperatures may be determined by, for example, measuring fluid temperatures in differentials or power transfer devices or computing a temperature for a clutch in the driveline assembly by determining energy input to the clutch. The system and method then compute a gain factor responsive to the operating temperature and adjust a control parameter value of a traction control system in the vehicle responsive to the gain factor. The control parameter value of the traction control system may comprise, for example, a maximum speed differential between two wheels on the vehicle, an amount of braking force applied by a vehicle brake or an amount of output torque provided by a vehicle engine. The system and method generate a control signal from the traction control system responsive to the control parameter value to adjust at least one of an output torque of the engine and a braking force of a brake.

Referring now to the drawings wherein like reference numerals are used to identify identical components in the various views, FIG. 1 illustrates one embodiment of a vehicle 10 incorporating a system for controlling temperatures in a driveline assembly of vehicle 10. In the illustrated embodiment, vehicle 10 comprises a conventional vehicle powered by an internal combustion engine. It should be understood, however, that the system and method disclosed herein can be used with a wide variety of vehicles, including hybrid vehicles powered by an internal combustion engine and one or more electric motors including PHEVs, hybrid electric vehicles (HEVs), or extended-range electric vehicles (EREVs), to cite a few possibilities. Vehicle 10 may include a power source 12, a drive line assembly 14 that delivers power from power source 12 to one or more vehicle wheels 16, one or more brakes 18, and a traction control system 20 among other components.

Power source 12 generates locomotive power for vehicle 10. Power source 12 may comprise an internal combustion engine that is mechanically coupled to, and used to directly drive, wheels 16 which in turn propel the vehicle (e.g., in a conventional vehicle or a parallel hybrid vehicle) using conventional internal combustion techniques. Alternatively, the engine may indirectly drive the vehicle wheels 16 through a generator and an electric motor (e.g., in a series hybrid vehicle). The engine may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. In some embodiments, power source 12 may alternatively comprise an electric motor that uses electrical energy stored in a battery to drive wheels 16. The motor may comprise a single discrete device or may be combined with a generator (a so-called "mogen") or it may include multiple electric motors (e.g., separate motors for the front and rear wheels, separate motors for each wheel, separate motors for different functions, etc.). The motor may, for example, comprise an AC motor (e.g., a three-phase AC induction motor, a multi-phase AC induction motor, etc.), as well as a generator that can be used during regenerative braking. It should be understood, however, that the motor may alternatively comprise AC or DC motors, brushed or brushless motors, permanent magnet motors, etc.

Drive line assembly 14 delivers power from power source 12 to vehicle wheels 16. Drive line assembly 14 may include forward and rear axles 22, 24, a power transfer device 26, and one more clutches 28, 30, 32.

Axles 22, 24 support wheels 16. One of axles 22, 24 (in the case of a forward wheel drive (FWD) or rear wheel drive (RWD) vehicle) or both of axles 22, 24 (in the case of a four wheel drive or all wheel drive (AWD) vehicle) may transmit power from power transfer device 26 to wheels 16. Axles 22, 24 may each include a drive shaft or shafts coupled to wheels 16 on either side of vehicle 10. Either or both of axles 22, 24 may comprise a drive axle with a gear set 34, 36 that transmits torque from a propeller shaft 38, 40 or other output of power transfer device 26 to the drive shafts. The gear sets 34, 36 may comprise, for example, differential gear sets allowing the wheels 16 on a given axle 22, 24 to rotate at different speeds and including a pinion gear coupled to the propeller shaft 38, 40 or other output of power transfer device 26, a ring gear coupled to a differential case and in mesh with the pinion gear, and a side or bevel gear set disposed within the case and coupled to the drive shafts.

Power transfer device 26 is configured to transmit power from power source 12 to forward and rear axles 22, 24 on vehicle 10 and to divide the power output by power source 12 between axles 22, 24. Power transfer device 26 may comprise, for example, a power transfer unit (PTU) (such as a transaxle) or a transfer case depending on the configuration of vehicle 10.

Depending on the configuration of vehicle 10, clutch 28 may control delivery of power to rear axle 24 while clutches 30, 32 may control delivery of power from gear set 36 of rear axle 24 to individual wheels 16. It should be understood that each of clutches 28, 30, 32 may or may not be included depending on the configuration of vehicle 10. In some embodiments, for example, vehicle 10 may include only one of clutches 28, 30, 32 so as to control torque transfer to rear axle 24 (in the case of clutches 30 or 32, torque transfer across axle 24 would occur through gear set 36). In another embodiment, vehicle 10 includes both of clutches 30 and 32 to allow control of torque transfer to rear axle 24 as well as independent control of torque transfer to the rear wheels on either side of axle 24 without a differential gear set. Clutches 28, 30, 32 may comprise disc clutches in which discs coupled to a driving member such as a propeller shaft 40 or output shaft of gear set 36 are interleaved with discs coupled to a driven member such as a pinion shaft input to the gear set 36 or a wheel end shaft supporting a wheel 16, respectively. A piston in the clutch 28, 30, 32 may compress the discs to couple the driving and driven members for rotation upon delivery of fluid pressure (hydraulic or pneumatic) to the clutch. Delivery of fluid pressure may be controlled using electronically controlled valves that open and close responsive to control signals from various vehicle systems. It should be understood that, while an exemplary clutch structure has been described herein, the structure of the clutch may vary and may include, for example, electromagnetic actuation of the clutch as opposed to fluid actuation.

Brakes 18 are provided to inhibit rotation of wheels 16. Brakes 18 may comprise fluid actuated disc brakes in which one or more pistons in a brake caliper are moved under fluid pressure to bring friction pads into engagement with a rotor that is configured to rotate with a wheel 16. It should be understood, however, that other forms of brakes 18 may be used in vehicle 10 including drum brakes. A brake controller 42 may control delivery of fluid pressure to individual brakes 18. Controller 42 may include a variety of electronic processing devices, memory devices, input/output (I/O) devices, and/or other known components, and may perform various control and/or communication related functions. In an exemplary embodiment, controller 42 includes an electronic memory device 44 that stores look up tables or other data structures, software programs, etc. Controller 42 may also include an electronic processing device 46 (e.g., a microprocessor, a microcontroller, an application specific integrated circuit (ASIC), etc.) that executes instructions for software, firmware, programs, algorithms, scripts, etc. that are stored in memory device 44. Controller 42 may also include an input/output interface 48 configured to output control signals to brakes 18 to control the application of brakes 18 and receive input signals from various sources including driver commands for service or emergency braking and from control signals from various vehicle systems including traction control system 20. Depending on the particular embodiment, controller 42 may be a stand-alone vehicle electronic module, it may be incorporated or included within another vehicle electronic module (such as an anti-lock braking system or electronic stability control system), or it may be part of a larger network or system such as a body control module. Controller 42 may be electronically connected to other vehicle devices, modules and systems via a vehicle communications bus 50 or other communication means and can interact with them when required.

Traction control system 20 controls delivery of power to vehicle wheels 16 in order to eliminate wheel slip due to, for example, low friction road surfaces (e.g., icy, snowy or sandy road surfaces). Control system 20 may include wheel speed sensors 52 and a controller 54.

Wheel speed sensors 52 are coupled to each wheel 16 of vehicle 10 and separately report the rotational velocity of each wheel 16. In addition to rotational velocity, it will be understood that other parameters may be derived or calculated from the velocity readings, such as vehicle acceleration. Sensors 52 may operate according to optical, electromagnetic or other technologies. In some embodiments, sensors 52 may determine rotational velocity relative to the ground by directing radar, laser and/or other signals towards the ground and analyzing the reflected signals, or by employing feedback from a navigation module (not shown) that has Global Positioning System (GPS) capabilities. Sensors 52 may form part of an anti-lock braking system.

Controller 54 is provided to control power source 12 and/or brakes 18 in order to eliminate wheel slip and maintain effective traction in vehicle 10. In accordance with the present teachings, controller 54 is also provided to control temperatures in driveline assembly 14. Controller 54 may include a variety of electronic processing devices, memory devices, input/output (I/O) devices, and/or other known components, and may perform various control and/or communication related functions. In an exemplary embodiment, controller 54 includes an electronic memory device 56 that stores look up tables or other data structures, software programs, etc. Controller 54 may also include an electronic processing device 58 (e.g., a microprocessor, a microcontroller, an application specific integrated circuit (ASIC), etc.) that executes instructions for software, firmware, programs, algorithms, scripts, etc. that are stored in memory device 56. Controller 54 may also include an input/output interface 60 configured to output control signals to power source 12 and/or brakes 18 to control the power output of power source 12 and the application of brakes 18 and receive input signals from various sources including wheel speed sensors 52. Where power source 12 includes an internal combustion engine, the control signals output by controller 54 may directly control, or indirectly control through an engine control module or the like, a throttle valve, fuel injectors, and/or or spark plugs, to control delivery of air or fuel and/or spark timing in cylinders of an internal combustion engine in order to control the power output by power source 12. In vehicles equipped with a turbocharger, control signals may also control the boost pressure provided by the turbocharger to power source 12. Where power source 12 includes an electric motor, the control signals output by controller 54 may directly control, or indirectly control, delivery of current from a vehicle battery to the motor and/or regulate the voltage output by the motor. The control signals output by controller 54 may also directly control, or indirectly control through brake controller 42, actuation of brakes 18 by controlling fluid pressure delivered to brakes 18 from a master cylinder, compressor or other hydraulic or pneumatic fluid source. Depending on the particular embodiment, controller 54 may be a stand-alone vehicle electronic module, it may be incorporated or included within another vehicle electronic module, or it may be part of a larger network or system such as a body control module. Controller 54 may be electronically connected to other vehicle devices, modules and systems via vehicle communications bus 50 or other communication means and can interact with them when required.

In accordance with various embodiments disclosed herein, controller 54 is configured with appropriate programming instructions or code (i.e., software) to perform several steps in a method for controlling temperatures in driveline assembly 14. The code may be stored in memory device 56 of controller 54 and may be uploaded to memory device 56 from, a conventional computer storage medium. Referring now to FIG. 2, the method may begin with the step 62 of determining one or more operating temperatures associated with portions of driveline assembly 14. As illustrated in FIG. 2, step 62 may be performed in several ways. In some embodiments, step 62 may include the substep 64 of measuring an operating temperature associated with driveline assembly 14. For example, temperature sensors may measure the temperature of a lubricating fluid in the housing of one of gear sets 34, 36 of axles 22, 24 or in the housing for power transfer device 26. Signals generated by the temperature sensors may be transmitted to controller 54 over communications bus 50.

In other embodiments, step 62 may include several substeps intended to indirectly determine an operating temperature associated with driveline assembly 14. In substep 66, an energy input value is computed that is indicative of an amount of energy input to driveline assembly 14 or a component thereof. Substep 66 may itself include several substeps 68, 70, 72. In substep 68, the output torque of power transfer device 26 or one of clutches 28, 30, 32 may be determined. The output torque may be determined by controller 54 based on a models and formulas derived from physical testing and that relate factors such as applied fluid pressure, temperatures, friction material characteristics and other factors to torque output. In substep 70, controller 54 determines a difference in speed between an input speed and an output speed of the power transfer device 26 or clutch 28, 30, 32. The difference in speed is indicative of slip within the power transfer device 26 or clutch 28, 30, 32 and absorption of energy within the power transfer device 26 or clutch 28, 30, 32. Input and output speeds can be determined using conventional speed sensors such as sensors 50. In substep 72, controller 54 calculates the energy input value responsive to the output torque and difference in speed. For example, in one embodiment, controller 54 may calculate the energy input value in accordance with the formula E=T*w*t where T represents the output torque, w represents the difference in input and output speeds and t represents time. Once the energy input value is computed, controller 54 may, in substep 74, obtain an operating temperature for driveline assembly 14 responsive to the energy input value. A relationship between energy input and operating temperatures for power transfer device 26 or clutch 28, 30, 32 can be established through experimental testing based on factors including temperature rise of the system as a function of thermal energy input, time and rate at which thermal energy loss occurs under operation.

Once one or more operating temperatures for driveline assembly 14 are determined, controller 54 may, in step 76, compute one or more gain factors. Step 76 may also include several substeps 78, 80. In substep 78, the operating temperature or temperatures may be compared to corresponding threshold temperatures. The threshold temperatures are indicative of normal operating limits for driveline assembly 14 and components of assembly 14. The threshold temperatures may be based, for example, on temperatures at which lubricating fluids in power transfer device 26 or clutches 28, 30, 32 lose beneficial properties or temperatures at which friction materials in clutches 28, 30, 32 begin to delaminate. If the operating temperature meets a predetermined condition relative to the threshold temperature (e.g., exceeds the threshold temperature), controller 54 may, in substep 80, calculate the gain factor. In one embodiment, controller 54 may compute the gain factor as a ratio of the operating temperature relative to a difference between maximum and minimum operating temperatures for the driveline assembly 14 in accordance with the following formula:

$$G = T_{OP}/T_{MAX}$$

in which $T_{OP}$ comprises the operating temperature determined in step 62 and $T_{MAX}$ represents the maximum operating temperature for driveline assembly 14. In embodiments where multiple operating temperatures have been determined, controller 54 may compute the gain factor responsive to more than one operating temperature (e.g., by weighting each operating temperature that meets a predetermined condition relative to a corresponding threshold). Alternatively, controller 54 may compute multiple gain factors with each gain factor corresponding to a corresponding one of the operating temperatures or some combination of the operating temperatures. Although calculation of the gain factor G is dependent on the operating temperature exceeding a threshold in the illustrated embodiment, it should be understood that it is possible to calculated the gain factor and perform the inventive method without setting a threshold for performing subsequent steps.

The method may continue with the step 82 of adjusting one or more control parameter values for traction control system 20 responsive to the gain factor or gain factors. The control parameter values may comprise limits used by traction control system 20 to determine when to generate control signals used to adjust the power output of power source 12 or the brake pressure applied by brakes 18 in order to maintain vehicle traction or limits on the amount of change in the power output of power source 12 or the brake pressure applied by brakes 18. By applying the gain factors to these limits, traction control system 20 can control temperatures within driveline assembly 14. In one embodiment, the control parameter value may comprise the maximum speed differential between two wheels 16 on vehicle 10 above which system 20 will generate a control signal to modify the behavior of power source 12 or brakes 18. Controller 54 may adjust the parameter value in accordance with the following formula $$\Delta_{MAX} = \Delta_{NORM} - (\Delta_{NORM} - \Delta_{PROTECT})^* G$$

where $\Delta_{NORM}$ is the default wheel speed differential at which system 20 generates a control signal to modify the behavior of power source 12 or brakes 18 under normal operating conditions, $\Delta_{PROTECT}$ is a predetermined speed differential at which protective action by system 20 is required and G is the gain factor computed in step 76. In another embodiment, the control parameter value may comprise an amount of braking force applied by a brake 18 to a wheel 16 of vehicle 10 when traction control is activated. Controller 54 may adjust the parameter value in accordance with the following formula $$BP_{GAIN} = BP_{NORM}^* (1+G)$$

where $BP_{NORM}$ represents a predetermined brake pressure applied in the event of a traction control event and G is the value computed in step 76. In another embodiment, the control parameter value may comprise an amount by which output torque provided by power source 12 is adjusted when traction control is activated. Controller 54 may adjust the parameter value in accordance with the following formula:

$$TR_{MAX} = TR_{NORM} - (TR_{NORM} - TR_{MAX})^* G$$

where $TR_{NORM}$ represents a predetermined torque reduction in power source 12 in the event of a traction control event under normal operating conditions, $TR_{MAX}$ represents a maximum allowable torque reduction in power source 12 and G is the value computed in step 76. Although each of the above exemplary formulas shows modification of a control parameter value responsive to a single, common gain factor, it should be understood that a given control parameter value could be adjusted in response to multiple computed gain factors or that individual control parameter values could be calculated in response to different computed gain factors to the extent multiple gain factors are computed in step 76. It should also be understood that the formulas set forth above are exemplary only. Finally, although exemplary formulas are set forth above, controller 54 may not actually compute the control parameter values, but instead may used the gain factor to access a pre-populated look up table in memory device 52 that stores values for the control parameter value indexed to the value of the gain factor.

The method may continue with the step 84 of generating one or more control signals from traction control system 20 responsive to the control parameter values. The control signals may be configured to adjust one or both of the output torque of power source 12 or a braking force of brake 18. As mentioned hereinabove, the control signals may, for example, directly control, or indirectly control through an engine control module or the like, a throttle valve, fuel injectors, and/or or spark plugs, to control delivery of air or fuel and/or spark timing in cylinders of an internal combustion engine in order to control the power output by power source 12. In vehicles equipped with a turbocharger, control signals may also control the boost pressure provided by the turbocharger to power source 12. Where power source 12 includes an electric motor, the control signals output by controller 54 may directly control, or indirectly control, delivery of current from a vehicle battery to the motor and/or regulate the voltage output by the motor. The control signals output by controller 54 may also directly control, or indirectly control through brake controller 42, actuation of brakes 18 by controlling fluid pressure delivered to brakes 18 from a master cylinder, compressor or other hydraulic or pneumatic fluid source. It should be understood that controller 54 may generate a given control signal responsive to one or more control parameter values and that controller 54 may generate multiple control signals with each control signal responsive to a different control parameter value or to some combination of control parameter values.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A system for controlling temperatures in a driveline assembly of a vehicle, comprising:
a traction control system including a controller configured to:

determine a first operating temperature associated with the driveline assembly of the vehicle, the driveline assembly comprising a forward axle, a rear axle and a power transfer device configured to transmit power from a power source of the vehicle to the forward and rear axles;

compute a first gain factor responsive to the first operating temperature the first gain factor capable of assuming any of at least three different values;

adjust a first control parameter value of the traction control system responsive to the first gain factor; and, generate a first control signal from the traction control system responsive to the first control parameter value, the first control signal configured to adjust at least one of an output torque of the power source and a braking force of a brake of the vehicle wherein the first gain factor comprises a ratio of the first operating temperature relative to a difference between a maximum operating temperature for the driveline assembly of the vehicle and a minimum operating temperature for the driveline assembly of the vehicle.

2. A method for controlling temperatures in a driveline assembly of a vehicle, comprising the steps of:

determining, in a controller of a traction control system of the vehicle, a first operating temperature associated with the driveline assembly of the vehicle responsive to an output of at least one sensor, the driveline assembly comprising a forward axle, a rear axle and a power transfer device configured to transmit power from a power source of the vehicle to the forward and rear axles;

computing, in the controller, a first gain factor responsive to the first operating temperature, the first gain factor capable of assuming any of at least three different values;

adjusting a first control parameter value of the traction control system of the vehicle responsive to the first gain factor; and, generating a first control signal from the traction control system responsive to the first control parameter value, the first control signal configured to adjust at least one of an output torque of the power source and a braking force of a brake of the vehicle wherein the first gain factor comprises a ratio of the first operating temperature relative to a difference between a maximum operating temperature for the driveline assembly of the vehicle and a minimum operating temperature for the driveline assembly of the vehicle.

3. The method of claim 2, wherein the determining step includes the sub step of measuring the first operating temperature.

4. The method of claim 3, wherein the measuring sub step includes measuring a temperature of a fluid in a differential of one of the forward and rear axles.

5. The method of claim 3, wherein the measuring sub step includes measuring a temperature of a fluid in the power transfer device.

6. The method of claim 2, wherein the determining step includes the substeps of:

computing an energy input value indicative of an amount of energy input to the driveline assembly; and, obtaining the first operating temperature responsive to the energy input value.

7. The method of claim 6, wherein the substep of computing the energy input value includes the substeps of:

determining an output torque of the power transfer device;

determining a difference in speed between input and output speeds of the power transfer device; and, calculating the energy input value responsive to the output torque of the power transfer device and the difference in speed.

8. The method of claim 6, wherein the substep of computing the energy input value includes the substeps of:

determining an output torque of a clutch in the driveline assembly;

determining a difference in speed between input and output speeds of the clutch; and, calculating the energy input value responsive to the output torque of the clutch and the difference in speed.

9. The method of claim 2, wherein the computing step includes the substeps of:

comparing the first operating temperature to a predetermined threshold temperature; and, calculating the first gain factor when the first operating temperature meets a predetermined condition relative to the predetermined threshold temperature.

10. A method for controlling temperatures in a driveline assembly of a vehicle, comprising the steps of:

determining, in a controller of a traction control system of the vehicle, a first operating temperature associated with the driveline assembly of the vehicle responsive to an output of at least one sensor, the driveline assembly comprising a forward axle, a rear axle and a power transfer device configured to transmit power from a power source of the vehicle to the forward and rear axles;

computing, in the controller, a first gain factor responsive to the first operating temperature, the first gain factor capable of assuming any of at least three different values;

adjusting a first control parameter value of the traction control system of the vehicle responsive to the first gain factor; and, generating a first control signal from the traction control system responsive to the first control parameter value, the first control signal configured to adjust at least one of an output torque of the power source and a braking force of a brake of the vehicle wherein the first control parameter value comprises a maximum speed differential between first and second wheels of the vehicle at which the first control signal is generated by the traction control system.

11. The method of claim 2, wherein the first control parameter value comprises an amount of braking force applied by the brake to a wheel of the vehicle.

12. The method of claim 2, wherein the power source comprises an engine and the first control parameter value comprises an amount by which output torque provided by the engine is adjusted when traction control is activated.

13. The method of claim 2, further comprising the step of generating a second control signal from the traction control system responsive to the first control parameter, the second control signal configured to adjust the other of the output torque of the power source and the braking force of the brake of the vehicle.

14. The method of claim 2, further comprising the steps of:

adjusting a second control parameter value of the traction control system of the vehicle responsive to the first gain factor; and, generating a second control signal from the traction control system responsive to the second control parameter value, the second control signal configured to adjust the other of the output torque of the power source and the braking force of the brake of the vehicle.

15. The method of claim 2 wherein
the first operating temperature is associated with a first portion of the driveline assembly of the vehicle
and further comprising the steps of:
determining, in the controller, a second operating temperature associated with a second portion of the driveline assembly of the vehicle responsive to an output of at least one other sensor;
computing, in the controller, a second gain factor responsive to the second operating temperature, the second gain factor capable of assuming any of at least three different values; and,
adjusting the first control parameter value of the traction control system of the vehicle responsive to the first gain factor and the second gain factor.

16. The method of claim 15, wherein the step of determining the first operating temperature includes the sub step of measuring the first operating temperature.

17. The method of claim 15, wherein the step of determining the first operating temperature includes the substeps of:
computing an energy input value indicative of an amount of energy input to the driveline assembly; and,
obtaining the first operating temperature responsive to the energy input value.

18. The method of claim 15, wherein the step of computing a first gain factor includes the substeps of:
comparing the first operating temperature to a predetermined threshold temperature; and,
calculating the first gain factor when the first operating temperature meets a predetermined condition relative to the predetermined threshold temperature.

19. The method of claim 15, further comprising the step of adjusting a second control parameter value of the traction control system of the vehicle responsive to the first gain factor and the second gain factor.

* * * * *